(12) United States Patent
Vermeulen (10) Patent No.: US 7,438,274 B2
(45) Date of Patent: Oct. 21, 2008

(54) ADJUSTABLE FOOT FOR SETTING UP EQUIPMENT IN ALIGNMENT

(75) Inventor: Rene Vermeulen, Spijkenisse (NL)

(73) Assignee: Machine Supports B.V., Ridderkerk (NL)

( * ) Notice: Subject to any disclaimer, the term of this patent is extended or adjusted under 35 U.S.C. 154(b) by 93 days.

(21) Appl. No.: 10/541,265

(22) PCT Filed: Jan. 6, 2004

(86) PCT No.: PCT/NL2004/000002

§ 371 (c)(1),
(2), (4) Date: Dec. 8, 2005

(87) PCT Pub. No.: WO2004/061357

PCT Pub. Date: Jul. 22, 2004

(65) Prior Publication Data

US 2006/0169866 A1 Aug. 3, 2006

(30) Foreign Application Priority Data

Jan. 6, 2003 (NL) .................................. 1022308
Jan. 6, 2003 (NL) .................................. 1022310

(51) Int. Cl.
*F16M 1/00* (2006.01)
(52) U.S. Cl. ..................................... 248/677; 248/188.4
(58) Field of Classification Search ................. 248/677, 248/188.2, 188.4, 188.1, 188; 428/66.6
See application file for complete search history.

(56) References Cited

U.S. PATENT DOCUMENTS 4,061,298 A 12/1977 Kober et al.

(Continued)

FOREIGN PATENT DOCUMENTS

DE 24 05 368 A 8/1975

(Continued)

OTHER PUBLICATIONS

International Search Report from Internat'l Application No. PCT/NL2004/000003, dated Jul. 5, 2004.

(Continued)

*Primary Examiner*—Ramon O Ramirez
(74) *Attorney, Agent, or Firm*—Greenberg Traurig LLP (57) ABSTRACT

The present invention relates to an adjustable foot for setting up equipment in alignment. The adjustable foot comprises an annular element provided with an axial bore with internal screw thread. The adjustable foot furthermore comprises a shaft element provided with external screw thread matching the internal screw thread. When screwed into the bore, this shaft element can be adjusted in the axial direction with respect to the annular element by turning with respect to the annular element. The adjustable foot furthermore comprises a support part, provided on the annular element or shaft element as well as a washer. The washer and the support part are each provided with a convex respectively concave surface having essentially the same radius of curvature, such that the angle of the washer with respect to the support part can be adjusted. According to the invention the top surface of the annular element is made to slope downwards in the radially outward direction. According to the invention the adjustable foot furthermore comprises a cap with a diameter greater than that of the internal screw thread. According to a further aspect, the invention relates to a combination of an adjustable foot according to the invention, a substructure and equipment set up in alignment on said substructure, as well as an anchor bolt, wherein the equipment is anchored to the substructure by means of the anchor bolt, with the adjustable foot between them.

48 Claims, 4 Drawing Sheets

U.S. PATENT DOCUMENTS

| | | | | |
|---|---|---|---|---|
| 6,068,234 A | * | 5/2000 | Keus | 248/637 |
| 6,889,946 B2 | * | 5/2005 | Bizaj | 248/188.2 |
| 2005/0061946 A1 | * | 3/2005 | Krapels | 248/677 |
| 2006/0237622 A1 | * | 10/2006 | Vermeulen | 248/637 |

FOREIGN PATENT DOCUMENTS

| | | |
|---|---|---|
| EP | 0 316 283 A | 5/1989 |
| WO | WO 03/036156 A | 5/2003 |

OTHER PUBLICATIONS

Photograph taken in Oct./Dec. 2002 at an exhibition in The Netherlands of a device originating from applicant of WO 03/036156.

* cited by examiner

ADJUSTABLE FOOT FOR SETTING UP EQUIPMENT IN ALIGNMENT

This application is a national stage filing under 35 U.S.C. 371 of International Application PCT/NL2004/000002, filed on Jan. 6, 2004 which claims priority from the Netherland Application No: 1022310, filed on Jan. 6, 2003 and Netherland Application No: 1022308, filed Jan. 6, 2003. The entire teachings of the referenced Applications are incorporated herein by reference. International Application PCT/NL2004/000002 was published under PCT Article 21(2) in English.

BACKGROUND

1. Field

The present invention relates to an adjustable foot for setting up equipment in alignment comprising:
- a first adjustable part provided with an axial bore with internal screw thread;
- a second adjustable part provided with external screw tread matching the initial screw thread, which second adjustable part, when screwed into the bore, can be adjusted direction with respect to the first adjustable part by turning with respect to the first adjustable part;
- a support part, provided on the first adjustable part or second adjustable part; and a washer, when the washer and the support part are each provided with a convex respectively concave surface having essentially the same radius of curvature, such that the angle of the washer can be adjusted with respect to the support part.

2. General Background

An adjustable foot of this type is disclosed in EP 316 283. The adjustable foot disclosed in the latter publication consists of a first adjustable part (2) and a second adjustable part (6) with, at the top, a broadened support part (4) that is concave on the top thereof. The second adjustable part is provided with an external screw thread and the first adjustable part is provided with an internal screw thread, which internal and external screw threads match one another such that when the second adjustable part (6) is turned with respect to the first adjustable part (2) the axial height of these parts with respect to one another is adjusted. On top of the support part (4) the is a washer (7) that is convex on the underside thereof, with a radius of curvature equal to the radius of curvature of the concave top of the support part (4).

Adjustable feet as disclosed in EP 316 283, like adjustable feet according to the preset invention, are used when placing pieces of equipment stable and level on a substrate so that, for example, vibration is avoided (consider, for example, washing machines that are positioned on the substrate by means of adjustable feet so that they are as stable as possible), also so that introducing stresses into the equipment is avoided when tightening anchor bolts for anchoring and also for aligning various pieces of equipment with respect to one another. In the latter case consideration must be given, for example, to a motor that is connected to a powered installation by means of a shaft, where the motor and the powered installation are separate units which usually have to be aligned with one another with regard to the transmission shaft. Adjustable feet are also used for this purpose.

The adjustable foot according to EP 316 283 has the disadvantage that dirt and moisture is able to ingress into the threaded joint of internal and external screw thread. This plays a role in particular when the adjustable foot has not been screwed into its lowest position when it is in use. After all, there is then a gap between the broadened support part (4) and the first adjustable part (2) via which dirt and moisture are able to ingress into the threaded joint. This can result in said threaded joint seizing and not allowing any further turning.

BRIEF SUMMARY

The aim of the present invention is to provide an improved adjustable foot with which the ingress of dirt and moisture into the threaded joint of the internal and external screw thread is counteracted and preferably is entirely prevented.

According to the invention the abovementioned aim is achieved with the adjustable foot of the type mentioned in the preamble in that the top surface of the first adjustable part is made sloping downwards in the radially outward direction. What is achieved by making the top surface of the first adjustable part slopping downwards in the radially outward direction is that dirt or moisture that lands on this surface is guided towards the outside of the first adjustable part thus away from the threaded joint, or at least in the opposite direction, that is to say the passage of dirt and moisture towards to threaded joint is made more difficult.

On grounds of cost it is preferable according to the invention if the top surface of the first adjustable part tapers in the radially outward direction. Such a tapering surface, that is to say a surface in a straight line in to radial direction, is easier to produce than a curved surface, which thus will lead to relatively lower costs. With this arrangement the top surface will preferably taper at an angle of approximately 5° to 15° with respect to the axial axis, this angle preferably being at most approximately 12°. The angle can be, for example, approximately 10°. If this angle of taper becomes too large, the upper part of the internal screw thread in the first adjustable part will lose some of its bearing capacity because it will tend to stretch radially, the external screw thread of the second adjustable part losing its engagement at this location. If the angle of taper is to small, the dirt and moisture will be subject to an inadequate fall oriented radially outwards.

In order further to counteract the ingress of dirt and moisture into the threaded joint of internal and external screw thread it is advantageous according to the invention if the adjustable foot further comprises a cap with a diameter greater than the diameter of the internal screw thread an/or greater than the diameter of the washer. This cap will then overlap the threaded joint or protrude beyond the washer and this form a further obstacle the penetration of dirt and moisture into the internal/external screw thread and counteract the ingress of dirt and moisture between the convex and concave dish surfaces.

However, according to the invention this cap can also be used independently of a surface of the first adjustable part that slopes downwards in the radially outward direction. According to a further aspect, the present invention then also relates to an adjustable foot for setting up equipment in alignment, comprising:
- a first adjustable part provided with an axial bore with internal screw thread;
- a second adjustable part provided with external screw thread matching the internal screw thread, which second adjustable part, when screwed into the bore, can be adjusted in the axial direction with respect to the first adjustable part by turning with respect to the first adjustable part;
- a support part, provided on the first adjustable part or second adjustable part and a washer, wherein the washer and the support part are each provided with a convex respectively concave surface having essentially the same radius of curvature, such that the angle of the washer can be adjusted with respect to the support part;

characterised in the adjustable foot furthermore comprises a cap with a diameter greater than the diameter of the internal screw thread and/or greater than the diameter of the washer.

So that the cap reliably counteracts the ingress of dirt and/or moisture into the threaded joint and between the convex and concave dish surfaces it is advantageous according to the invention if the diameter of the cap is at least 10%, in particular at least 25%, greater than the diameter of the internal screw thread and the diameter of the washer, respectively. In this context it is particularly advantageous if the internal diameter of the cap is greater than the largest of the external diameters of the other parts of the adjustable foot, in particular is least approximately 0.5 to 2% greater than said largest of the external diameters of the other parts. In this way it is ensured that the cap is able to completely cover the remainder of the adjustable foot from the top.

According to the invention it is particularly advantageous if the cap extends downwards from the washer below the bottom outer peripheral edge of the washer, preferably extends at least approximately 5 to 10 mm below said bottom outer peripheral edge. In this way a protective overlap with the outer boundary line of the zone of contact between the concave and convex surfaces is reliably ensured.

According to the invention it is particularly advantageous if the cap contains a space, delimited by the cap, which has an axial height that is greater than or equal to the maximum length by which the second adjustable part can protrude from the first adjustable part, or at least is intended to protrude at the maximum. In this context the intended ware will be determined by the adjustment range. In this way it is ensured that the bottom edge of the cap, coming from above, always reaches to below the top edge of the zone where the internal and the external screw thread engage in one another and also that the convex and concave surfaces are always protected against dirt and moisture.

So that the cap will not impede screwing of the internal and external screw tread completely into one another, it is advantageous according to the invention if the axial height of the interior space is at most equal to the axial height of the unit formed by the first adjustable part, second adjustable part and washer when the internal and external screw thread are completely screwed into one another. So that the cap does not impede tilting of the washer with respect to the vertical with this arrangement it is preferable according to the invention if the maximum axial height of the interior space is less than or equal to 95% to 99% of the maximum value that has just been mentioned.

With a view to stability of the adjustable foot during installation, it is preferable according to the invention if the top of the second adjustable part composes the support part and if this support part is thus not provided on the top of the first adjustable part.

With a view to minimising the overall height of the adjustable foot it is advantageous according to the invention if the support part is located completely within a contour determined by the diameter of the external screw thread more particularly if the entire second adjustable part is located within a contour determined by the diameter of the external screw thread. In this way it is possible to let the second adjustable part sink completely into the first adjustable part.

In order to minimise the overall height of the adjustable foot, it is preferable according to the invention if the support part is at least partially, preferably completely, sunken in a zone of the second adjustable part that is surrounded by the external screw thread.

In order to minimise the overall height of the adjustable foot, it is preferable according to the invention if the diameter of the her is smaller than the of the second adjustable part. In this way the inclination of the washer can still be adjust if the second adjustable part is sunken in the first adjustable part. Preferably, the diameter of the washer is approximately 4 to 10 mm smaller than the diameter of the second adjustable part, for example approximately 6 mm smaller.

On stability grounds it is preferable according to the invention if the support part has a concave surface and the washer has a convex surface. The washer is then not able to slip off the support part by itself be it is in a hollow, i.e. the concave surface of the support part. This plays a role in particular when in installing an adjustable foot according to the invention. So that the equipment to be set up in alignment by means of the adjustable foot, it is according to the invention can also be anchored to the substrate via the adjustable foot, it is preferable according to the invention if the second adjustable part and the washer are provided with an axial opening for an anchor bolt. So that the angle of the washer can be adjusted to an adequate extent, it is advantageous according to the invention if the axial opening through the washer has a diameter that is approximately 32 to 48% larger than the diameter of the axial open through the second adjustable part.

With a view to minimising the overall height of the adjustable foot it is furthermore advantageous according to the invention if the axial length of the second adjustable part is equal to or less than the axial height of the first adjustable part and if the second adjustable part is provided with external screw thread along its external axial length and/or the internal screw thread of the axial bore extends over the entire axial height of the first adjustable part. In this way it is ensured that the second adjustable part can be completely sunken in the first adjustable part without as a result the second adjustable part having to protrude from the first adjustable part on any side.

The adjustable foot known from EP-316.283 has a first adjustable part (2) with a relatively high axial height, which, in turn, results in a relatively high overall height for the adjustable foot as a whole.

The aim of the present invention is, according to a still faster aspect, to provide an adjustable foot of the type mentioned in the preamble, the overall axial height of which can be reduced.

Said aim is achieved according to the invention with an adjustable foot of the type mentioned in the preamble in that the external diameter of the first adjustable pact is at least 1.4 times the diameter of the matching internal and external screw threads. In the case of a adjustable foot of the type mentioned in the preamble it is important to realise that the shaft part must be able to transmit very high loads to the first adjustable part without the adjustable foot giving way. Conventionally, the approach here was that the length of the engagement between the matching internal and external screw thread had to be chosen sufficiently long. Moreover, it then had to be ensured that the shaft part was at all times screwed into the first adjustable part over a certain minimum distance so that a minimum length of engagement between the matching screw threads was obtained. The Applicant has now found that it is not so much the length of between the matching screw threads that prevents failure of the adjustable foot, but that, rather, in this context it is important to ensure that the first adjustable part does not stretch radically under the influence of the load borne by the adjustable foot, which load is transferred via the external screw thread an the second adjustable part and the internal screw thread on the first adjustable part with the internal screw thread of the first adjustable part would be lost and radially to a sufficient extent, engagement of the external screw thread of the second adjustable part with the internal screw trend of the first adjustable part would be lost and the second adjustable part would drop downwards along the first adjustable part. The Applicant has now found that here it suffices to impose the requirement that the external diameter of the first adjustable part is at least 1.4 times the diameter of the matching internal and external screw thread.

In this context the Applicant has furthermore found that increasing the external diameter of the first adjustable part makes only a small contribution to the resistance to failure if the diameter of the first adjustable part exceeds a magnitude of 1.9 times the diameter of the matching internal and external screw thread. In particular, in this context it is preferable if the external diameter of the first adjustable part is at most 1.6 times diameter of the matching internal and external screw thread.

As far as the axial height of the internal screw thread is concerned, a length in the range of 16 to 25 mm surfaces according to the invention.

According to a further aspect the invention relates to a combination of an adjustable foot according to the invention, a substructure, equipment set up in alignment on said substructure, and an anchor bolt, where the equipment is anchored to the substructure by means of the anchor bolt, with the adjustable foot between them. It is particularly advantageous here if a bottom surface of the first adjustable part rests on the substructure and if the equipment is in contact with the washer or with the cap which, in turn, is in contact with the washer.

According to yet a further aspect, which can be completely independent of the other aspects the present invention relates to an adjustable foot for setting up equipment in alignment, comprising;

an annular element provided with an axial bore with internal screw thread;

a shaft element provided with an axial screw thread matching the internal screw thread, which shaft element, when screwed into the bore, can be adjusted in the axial direction with respect to the annular element by turning with respect to the annular element;

a support part, provided on the annular element or shaft element, and a washer, wherein the washer and the support part are each provided with a convex respectively concave surface, having essentially the same radius of curvature, such that the angle of the washer can be adjusted with respect to the support part characterised in that, viewed in the axial direction, the height of the second adjustable part is less or equal to the height of the first adjustable part and in that, viewed in the radial direction, the dimensions of the second adjustable part are completely within the contour determined by the external screw thread. The minimum overall axial height of this adjustable foot has been minimized to the axial height of the first adjustable part. The second adjustable put can be screwed completely into the first adjustable part. With this arrangement it is advantageous, in particular, if the external diameter of the washer is less than the diameter external screw thread, and specifically in particular if the external diameter of the washer is approximately 4 to 10 mm, for example 6 mm, smaller than the diameter of the external screw thread. In this context the characterising clauses of Claims 1 and 5 constitute advantageous embodiments just as the other claims also constitute advantageous embodiments that as dependent claims can follow on from these.

BRIEF SUMMARY OF DRAWINGS

The present invention will be explained in more detail below with reference to the appended drawings. In the drawings.

DETAILED DESCRIPTION

Figure 1:
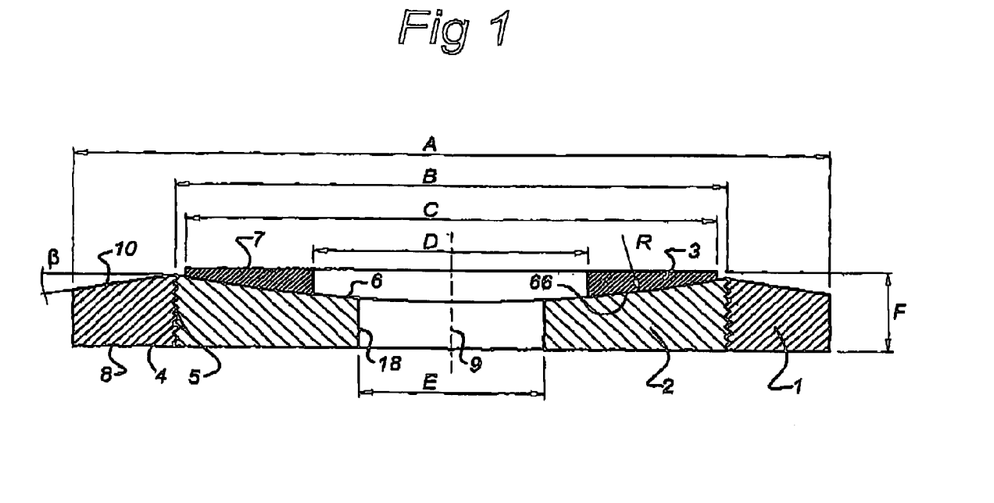
FIG. 1 shows a cross-sectional view of an adjustable foot according to the invention.

FIG. 1 shows, diagrammatically in cross-section, an adjustable foot according to the invention. This adjustable foot comprises an annular element 1 forming the first adjustable part, a shaft element 2 forming the second adjustable part and a washer 3. The annular element 1 is provided with internal screw thread 4 and the shaft element 2 is provided with external screw thread 5. The internal screw thread 4 and external screw bad 5 match one another, that is to say the shaft element 2 can be screwed into the annular element 1. The components 1, 2 and 3 and preferably made of steel, in particular a high grade steel.

The shaft element 2 is provided at the top with a support part in the form of a concave surface 6 with a radius of curvature R. The washer is provided on the underside thereof with a convex surface 66 with corresponding radius of curvature R. The washer is thus able to move with respect to the shaft element 2, it being possible for the inclination of the top surface 7 of the washer 3 to be adjusted with respect to the bottom surface 8 of the annular element 1 so that, on the one hand, flat contact of the underside 8 of the annular element 1 on the substrate and, on the other hand, flat contact of the top surface 7 of the washer with the underside of the equipment to be supported can be achieved.

Figure 2:
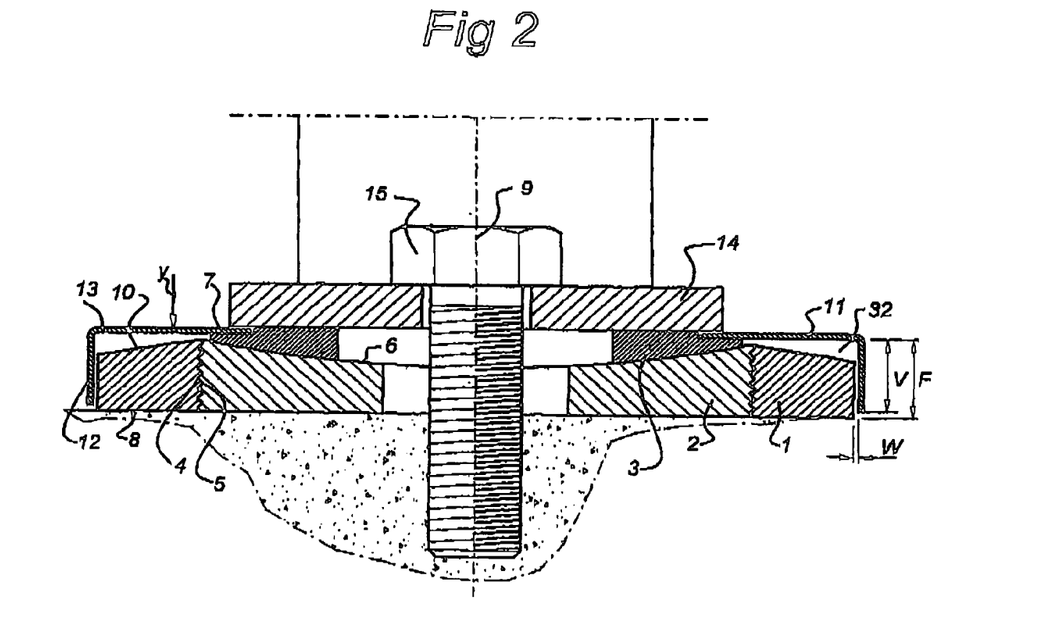
FIG. 2 shows, in cross-sectional, a variant of an adjustable foot according to the invention in an installed position.
Figure 4:
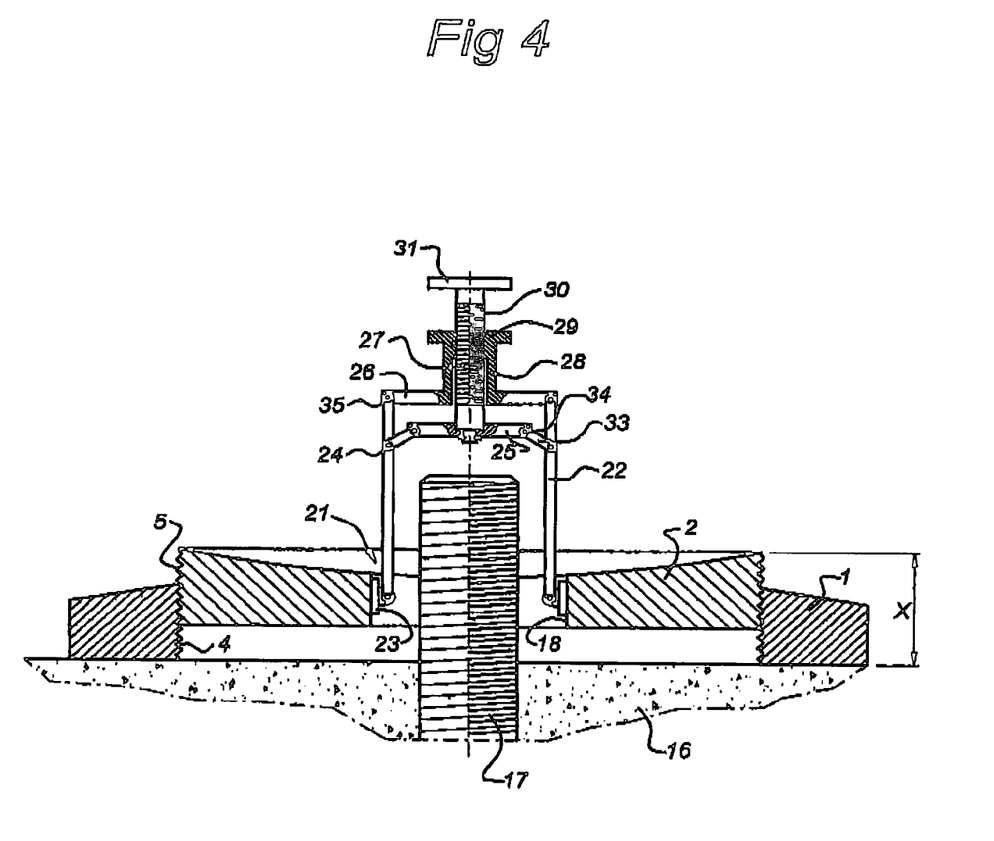
FIG. 4 shows a cross-sectional and partial front view of an adjustable foot according to the invention together with a second tool for installation.

By turning the shaft element 2 with respect to the annular element 1 (FIGS. 1 and 2 show a position in which they are completely screwed into one another, whilst FIG. 4 shows a position in which they are partially screwed into one another) the vertical distance X (see FIG. 4) bridged by the adjustable foot can be set as desired.

With reference to the reference symbols A, B, C, D, E, F, and R, in FIG. 1 and Table 1 below, ten models, called Type 1 to Type 10, are indicated by way of example in Table 1, with their values A, B, C, D, E, F and R. Except for F and R, these are diameter values. The adjustable foot has circular symmetry about axis 9.

TABLE 1

|  | A in mm | B in mm | A/B | C in mm | D in mm | E in mm | F in mm | R in mm |
| --- | --- | --- | --- | --- | --- | --- | --- | --- |
| Type 1 | 60 | 42 | 1.4 | 36 | 20 | 15 | 16 | 100 |
| Type 2 | 80 | 52 | 1.5 | 46 | 26 | 19 | 19 | 100 |
| Type 3 | 100 | 64 | 1.6 | 58 | 32 | 23 | 20 | 100 |
| Type 4 | 120 | 82 | 1.5 | 76 | 40 | 29 | 20 | 100 |
| Type 5 | 140 | 95 | 1.5 | 89 | 48 | 35 | 20 | 250 |
| Type 6 | 160 | 110 | 1.5 | 104 | 58 | 40 | 20 | 250 |

TABLE 1-continued

|  | A in mm | B in mm | A/B | C in mm | D in mm | E in mm | F in mm | R in mm |
|---|---|---|---|---|---|---|---|---|
| Type 7 | 190 | 130 | 1.5 | 124 | 68 | 46 | 20 | 250 |
| Type 8 | 220 | 160 | 1.4 | 154 | 80 | 54 | 25 | 400 |
| Type 9 | 230 | 160 | 1.4 | 154 | 84 | 62 | 25 | 400 |
| Type 10 | 250 | 170 | 1.5 | 164 | 95 | 70 | 25 | 400 |

The diameter of the washer 3 (see also Table 1) is approximately 6 mm smaller (i.e. B-C) than the diameter of the shaft element 2. This provides a relatively wide rang of inclinations for adjusting the inclination even when the shaft element has been screwed completely into the annular element 1.

In order to prevent dirt and moisture that reaches the adjustable foot from above being able to get into the main screw thread 4, 5, the top surface 10 of the annular element 1 is shaped such that it tapers at angle β in the radically outward direction. This angle β can be in the range from 5° to 15°. The more acute the angle β the be will dirt and moisture be guided away radially outwards from the matching screw thread 4, 5, but the greater will also be the adverse effect on the bearing capacity of the internal screw thread 4 if this continues to the top of the annular element.

FIG. 2 shows essentially approximately the same adjustable foot as in FIG. 1, but now provided with a cap 11. It is pointed out that the cap 11 can be fixed to the washer 34 but could also be formed as an integral unit with the washer 3.

The cap is preferably sunken either respect to the top surface of the washer. The cap is thus not a component that has to support the so-called equipment 14. The cap can then be made of a relatively weak material, such as plastic, compared with the washer. The primary purpose of the cap 11 is, on the one hand, to cover the matching screw thread 4, 5 from the top and, on the other hand, to protect the concave and convex surfaces 6, 66 against the ingress of dirt and moisture. For this purpose it is important that the cap 11 has a diameter that is greater than that of the internal screw thread 5 or external screw thread 4 (which comes down to the same thing) or is greater than the diameter of the washer. For this purpose it suffices if the cap 11, viewed from the axial axis 9, extends as far as, for example, approximately arrow Y, that is to say to beyond the matching screw thread 4, 5. In order to ensure this, the diameter of the cap 11 will preferably be at least 10%, more preferentially at least 25%, greater than the diameter of the matching screw thread 4, 5. What can be achieved by giving the cap 11 a larger diameter and providing it with a peripheral wall 12 that hangs down, so that an interior accommodating space 32 is formed below the top surface 13 of the cap and between the wall 12 that hands down, is that the ingress of dirt and/or moisture radially from the outside along the top of the annular element 1 is also counteracted. As will be clear, with this arrangement the tapering top surface 10 is no longer of direct importance, although it still does offer advantages. The tapering surface 10 could also optionally be dispensed with if the cap 11 has a diameter that extends only as far as approximately the arrow Y, that is to say if the cap has a diameter that is greater the diameter of the matching screw threads 4, 5.

FIG. 2 furthermore shows a foot section 14 of equipment to be set up in alignment, as well as a hexagonal bolt 15 provided with screw thread, by means of which said equipment 14 is anchored on the substrate 16. The adjustable foot in FIG. 2 is shown in the completely screwed-in position, but it will be clear that in the case of equipment set up in alignment this will not occur very often in practice.

In order to prevent the cap 11 as shown in FIG. 2 impeding the washer 3 in assuming a sloping position with respect to the shaft element 2, it is preferable according to the invention if the internal height V of the cap 11 is approximately 95% to 99% of the minimum overall height F (where the axial thickness of the cap 11 has been left out of consideration). Since the wall 12 of the cap 11 that extends downwards will locally tend to move towards the annular element 1 when the washer 3 tilts with resect to the shaft element 2, it is preferable according to the invention if the internal diameter of the cap 11 is larger than the largest external diameter of the other parts of the adjustable foot, in particular is approximately 0.5 to 2% larger than the largest of the external diameters of the other parts. With is arrangement the distance W is the half said 0.5 to 2% oversize in the cap diameter.

So as to prevent the shaft element 2 being pushed downwards with respect to the annular element 1 under the influence of a load acting in the direction of the axial axis 9, because the external screw thread 5 completely or partially loses engagement with the internal screw thread 4, it is import according to the invention to take a diameter that is at least 1.4 times the nominal diameter of the matching screw thread B for the external diameter A of the annular element 1. In this way it is reliably ensured that the annular element 1 is not able to stretch in the radial direction to such an extent that the internal screw thread 5 and external screw tread 4 locally lose their engagement. So that the internal screw thread can continue as a fully load-bearing screw thread up to the top of the annular element 1, it is preferable if the angle β is at most 15°, for example approximately 10°.

In order to keep the radial dimension of the adjustable foot according to the invention to a minimum at the same time, it is preferable according to the invention if the external diameter of the annular elements is at most 1.9 times the diameter of the matching internal and external screw thread, more preferentially at most 1.6 times said diameter of the matching internal and screw thread.

As will be clear from FIGS. 1 and 2, a very thin adjustable foot can be produced in terms of overall height by means of the measures described above according to the invention. Shaft element 2 can be given a maximum height that is equal to or less than the maximum axial height of the annular element 1. With this arrangement the concave surface 6 is as it were completely sunken in the region surrounded by external screw tread 5. However, this means that the shaft element 2 becomes less readily accessible, at leas compared with the known state of the art as described in EP 316 283. In order nevertheless to be able to adjust the shaft element 2 with respect to the annular element the invention provides a special tool. This will be explained in more detail with reference to FIG. 3 and FIG. 4.

Figure 3:
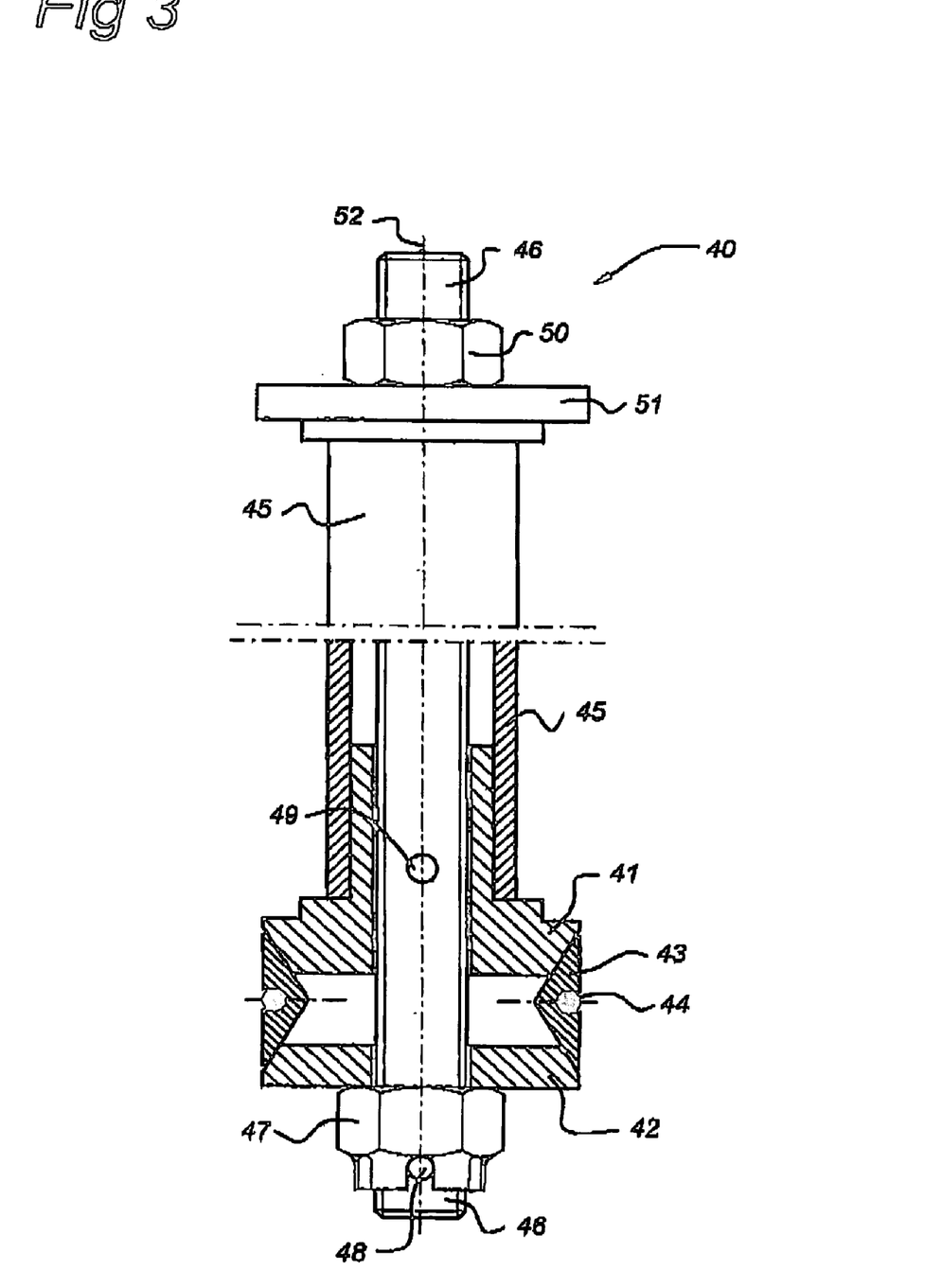
FIG. 3 shows a cross-sectional and partial front view of a first tool for installation.

FIG. 3 shows a first embodiment of such a tool 40. The tool 40 shown comprises a tension pin 46 provided with screw thread with an operating nut 50 at the top. The tension pin 46 runs through a sleeve 45. A second clamping block guide 41, acting as second support part, is provided at the bottom of the sleeve 45. The clamping block guide 41 has a tapering peripheral surface. A first clamping block guide 42, acting as first support part and likewise having a tapering guide surface, is provided below the clamping block guide 41. This first clamping block guide 42 bears on a nut 47. This nut 47 is fixed on the pin 46 by means of a locking pin 48 such that it cannot be turned. Three clamping blocks 43 are provided in the peripheral direction around the axial axis 52. These clamping blocks 43 are held together around the axis 52 by an elastic ring 44. The elastic ring 44 is pretensioned and allows the clamping blocks 43 to move radially outwards overcoming a spring force or to move radially inwards under the influence of the spring force. This depends on the change in the axial distance between guide part 41 and guide part 42. It is advantageous if the nut 47 is able to rotate with respect to the guide part 42. Rotation of the pin 46 with respect to the sleeve 45 is prevented by a peg 49 that is provided on the pin 46, runs transversely with respect to the pin and is accommodated in an axial slot provided in the sleeve 45. A closing flange 51 is provided at the top of the sleeve 45.

The axial distance between the guide parts 41 and 42 can now be changed by turning the nut 50. When the guide parts 41 and 42 move axially toward one another, the clamping blocks 43 are pushed radially outwards. When the guide parts 41, 42 move axially apart, the clamping blocks 43 will move radially inwards under the influence of the elastic pretension of ring 44. It will be clear to a person skilled in the art how the tool 40 is to be used in order to turn the shaft element 2 with respect to the annular element 1. For this purpose the bottom of the tool 40 is inserted in the bore 18 in such a way that the clapping blocks 43 are located in the bore. The nut 50 is then turned such that the guide parts 41 and 42 approach one another until the clamping blocks 43 engage sufficiently firmly on the peripheral wall of the bore 18. The shaft part 2 can then be turned by holding the tool 40 still and turning the annular element 1 or, conversely, holding the annular element 1 still and turning the tool 40 about the axis 52.

FIG. 4 shows a second embodiment of the tool. The tool 20 has an insertion end 21 that can be inserted in the axial direction into the hole 19 of the shaft element 2. For this purpose this insertion end 21 is provided with a type of fingers 22 (which optionally could also together form a closed sleeve). These fingers can be inserted over an end of a bolt 17 extending upwards so that the adjustable foot 1, 2 can first be placed on the substrate 16 while an anchoring bolt 17 has already been fixed in said substrate 16. Gripper means 23, in this case in the form of clamping blocks, are provided at the bottom of the fingers 22. These clamping blocks 23 can be opted by means of a lever mechanism, of which the fingers 22 form part. The lever mechanism essentially consists of the fingers 22 and arms 33, which are articulated on one another at 24 and the arms of which are articulated on a common second support part 25 at 34. The fingers 22 are also articulated on a common first support part 26 at 35. The clamping blocks 23 are moved radially outwards or radially inwards by now moving the support parts 25, 26 with respect to one another. This movement of the support parts 25 and 26 with respect to one another is, for example, possible by fixing the support part 25 on a pin 27, where rotation of support part 25 with respect to the longitudinal axis of the pin 27 is possible, and fixing support part 26 to the bottom of a sleeve 28 through which the pin 27 runs. The sleeve 28 is provided at the top thereof with a nut body 29 through which the pin 27 runs by means of screw tread 30. The movement of support part 25 with respect to support part 26 is produced by now rotating the pin 27 by mean of the arm 31 with resect to the sleeve 28.

It will be clear to those skilled in the art that the tools shown highly diagrammatically in FIGS. 3 and 4 are merely examples of possible embodiments. Specifically, such tools can be produced in very many ways. The advantage of such tools is that the bore 18 through the shaft element 2 does not have to be provided with special shaping. This can simply remain a circular bore as usual. However, the bore 18 could also be made non-circular, in which case the tool merely has to be provided with an insertion end that can be inserted in the non-circular bore 18 with a tight fit. This can be achieved, for example, by providing the non-circular bore with an axial slot on opposite sides and making the insertion end 21 as it were plate-shaped, the ends of the plate then being accommodated at opposite sides of the bore 18 in the slots made.

With reference to FIG. 2 of this application and to the figure in EP 888 514, reference number 23, it is pointed out that the cap 11 can also work in conjunction with a scale provided on the annular element 1. Because in the case of the present invention the cap 11 is able to tilt with respect to the annular element 1, in the case of the present invention it is preferable to provide the annular element 1 with a number of vertical scales provided distributed around the periphery or with a scale extending over the entire periphery. Furthermore, multiple scales make reading easier. According to the invention the scale can also be a single reference line. This can, for sample, indicate the maximum (unscrewing) height of the adjustable foot. This maximum unscrewing height will then be so determined that the associated length of engagement between the internal and external screw thread has an adequate bearing capacity to be able to support a predetermined design load as a consequence of the so-called 'equipment'.

Figure 5:
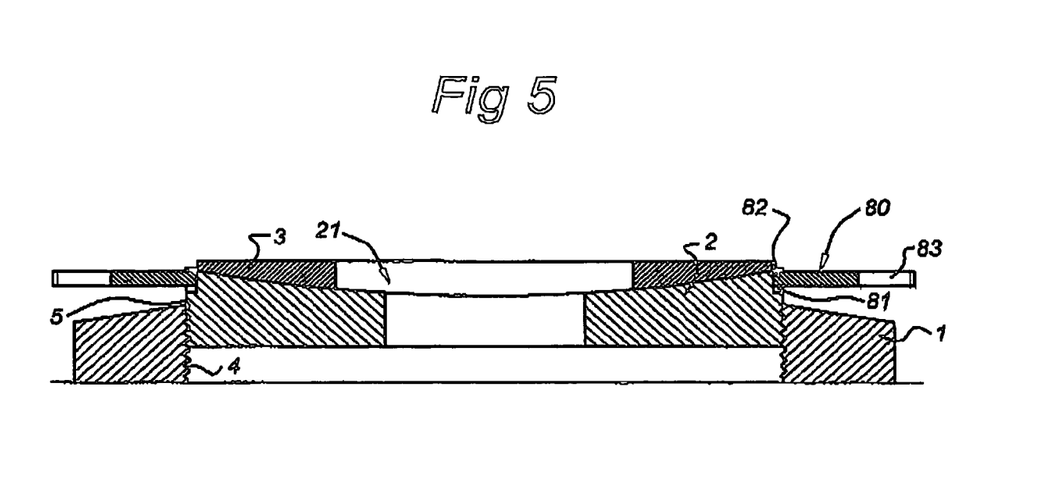
FIG. 5 shows in cross-sectional view a further alternative of as adjustable foot according to the invention.
Figure 6:
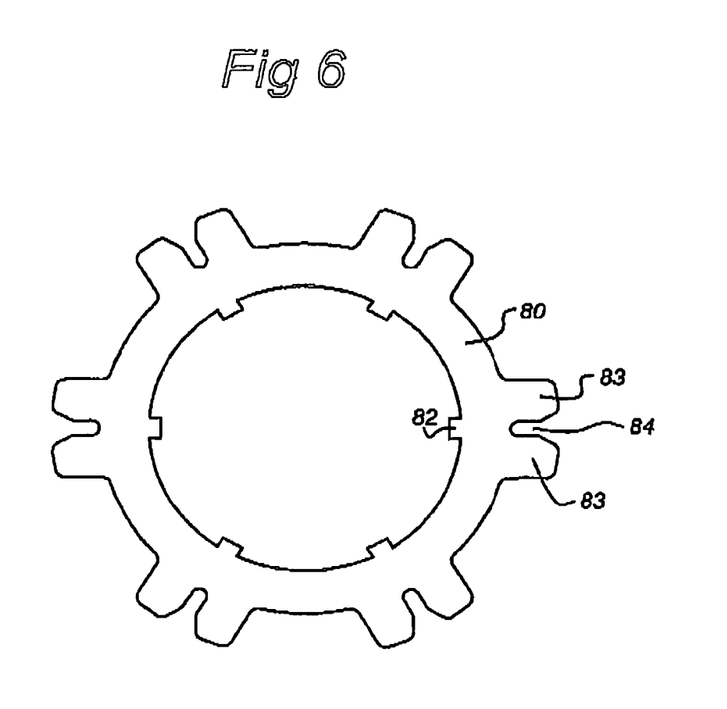
FIG. 6 shows in top view the cap of the further alternative according to FIG. 5.

FIGS. 5 and 6 show a further alternative of an adjustable foot according to the invention. As the difference between FIGS. 5 and 6 and the other figures essentially lies in the particular cap, corresponding references are used for the other parts.

With reference to FIG. 5, the shaft element 2 is, at the top, provided with recesses 81 distributed around the circumference. Further, there is provided a cap 80, which joins to the shaft element 2 and extends from the shaft element 2 above the annular element 1 in order to protect the matching screw threads 4, 5 against the action of dirt. The cap 80 is in this case in the form of a flat ring made from sheet material. At its inner circumference the cap 80 is provided with teeth engaging the recesses 81 in the shaft element. In this manner, the cap 80 is fixed with respect to the shaft element in the sense that they can not rotate with respect to each other.

At its outer circumference, the cap 80 is provided with a number of finger pairs 83 having in between a slot 84. The fingers 83 extend beyond the circumferential contour of the annul element 1. The fingers 83 can be used to rotate the shaft element 2 with respect to the annular element 1. In this manner, the height of the adjustable for according to the invention is adjustable, also when the device to be aligned is already placed on the adjustable foot.

It is noted that the number of teeth 82, and the number of fingers 83 of pairs of fingers 83 can be carried between broad limits from 1 up to easily 10 or more.

The invention claimed is:

1. Adjustable foot for setting up equipment in alignment, comprising: an annular element provided with an axial bore with internal screw thread; a shaft element provided with external screw thread matching the internal screw thread, which shaft element, when screwed into the bore, can be adjusted in the axial direction with respect to the annular element by turning with respect to the annular element; a support part, provided on a top of the shaft element, and a washer, wherein the washer and the support part are each provided with a convex respectively concave surface having essentially the same radius of curvature, such that an angle of the washer can be adjusted with respect to the support part about the radius of curvature; wherein a top surface of the annular element is made sloping downwards in the radially outward direction, and the support part is provided at the top of the shaft element, in that the support part is located completely within a contour determined by the diameter of the external screw thread, and in that an external diameter of the washer is at most equal to an external diameter of the second adjustable part.

2. The adjustable foot according to claim 1, wherein the top surface of the annular element tapers in the radially outward direction.

3. The adjustable foot according to claim 2, wherein the top surface tapers at an angle of approximately 5° to 15° with respect to the axial axis, this angle preferably being at most approximately 12°.

4. The adjustable foot according to claim 1, wherein the adjustable foot further comprises a cap with a diameter greater than that of the internal screw thread and/or greater than the diameter of the washer.

5. The adjustable foot according claim 1, wherein the internal diameter of the cap is greater than the largest of the external diameters of the other parts of the adjustable foot, in particular is approximately 0.5 to 2% greater than said largest of the external diameters of the other parts.

6. The adjustable foot according to claim 5, wherein the cap contains a space, delimited by the cap, which has an axial height that is greater than or equal to the maximum axial length by which the shaft element can protrude from the annular element, or at least is intended to protrude at the maximum above the annular element.

7. The adjustable foot according to claim 6, wherein the cap extends downwards from the washer below the bottom outer peripheral edge of the washer, preferably extends at least approximately 5 to 10 mm below said bottom outer peripheral edge.

8. The adjustable foot according to claim 6, wherein the axial height of the interior space is at most equal to the axial height of the unit formed by the annular element, shaft element and washer when the internal and external screw thread are completely screwed into one another, preferably is less than or equal to 95% to 99% of said maximum height.

9. The adjustable foot according to claim 1, wherein the support part is at least partially, preferably completely, sunken in a zone of the shaft element that is surrounded by the external screw thread.

10. The adjustable foot according to claim 1, wherein, viewed in the axial direction, the height of the second adjustable part is less than or equal to the height of the first adjustable part and wherein, viewed in the radial direction, the dimensions of the second adjustable part are completely within the contour determined by the external screw thread.

11. The adjustable foot according to claim 1, wherein the support part has a concave surface and the washer a convex surface.

12. The adjustable foot according to claim 1, wherein the shaft element and the washer are provided with an axial opening for an anchor bolt.

13. The adjustable foot according to claim 1, wherein the axial opening through the washer has a diameter that is approximately 32 to 48% larger than the diameter of the axial opening through the shaft element.

14. The adjustable foot according to claim 1, wherein the axial length of the shaft element is equal to or less than the axial height of the annular element and wherein the shaft element is provided with external screw thread along its entire axial length and/or the internal screw thread of the axial bore extends over the entire axial height of the annular element.

15. A combination comprising an adjustable foot according to claim 1, a substructure, equipment set up in alignment on said substructure, and an anchor bolt, wherein the equipment is anchored to the substructure by means of the anchor bolt, with the adjustable foot between them.

16. The combination according to claim 15, wherein a bottom surface of the annular element rests on the substructure and wherein the equipment is in contact with the washer or with the cap which, in turn, is in contact with the washer.

17. The adjustable foot according to claim 1, wherein the adjustable foot further comprises a cap with a diameter greater than that of the internal screw thread and/or greater than the diameter of the washer.

18. Adjustable foot for setting up equipment in alignment, comprising: a first adjustable part provided with an axial bore with internal screw thread; a second adjustable part provided with external screw thread matching the internal screw thread, which second adjustable part, when screwed into the bore, can be adjusted in the axial direction with respect to the first adjustable part by turning with respect to the first adjustable part; a support part, provided on the first adjustable part or second adjustable part, and a washer, wherein the washer and the support part are each provided with a convex, respectively, concave surface having essentially the same radius of curvature, such that an angle of the washer can be adjusted with respect to the support part about the radius of curvature; wherein an external diameter of the first adjustable part is at least 1.4 times a diameter of the matching internal and external screw thread.

19. The adjustable foot according to claim 18, wherein the external diameter of the first adjustable part is at most 1.9 times the diameter of the matching internal and external screw thread.

20. The adjustable foot according to claim 18, wherein the external diameter of the first adjustable part is at most 1.6 times the diameter of the matching internal and external screw thread.

21. The adjustable foot according to claim 20, wherein the axial height of the internal screw thread is in the range of 16-25 mm.

22. The adjustable foot according to claim 18, wherein the axial height of the internal screw thread is in the range of 16-25 mm.

23. The adjustable foot according claim 18, wherein the internal diameter of the cap is greater than the largest of the external diameters of the other parts of the adjustable foot, in particular is approximately 0.5 to 2% greater than said largest of the external diameters of the other parts.

24. The adjustable foot according to claim 23, wherein the cap contains a space, delimited by the cap, which has an axial height that is greater than or equal to the maximum axial length by which the shaft element can protrude from the annular element, or at least is intended to protrude at the maximum above the annular element.

25. The adjustable foot according to claim 24, wherein the cap extends downwards from the washer below the bottom outer peripheral edge of the washer, preferably extends at least approximately 5 to 10 mm below said bottom outer peripheral edge.

26. The adjustable foot according to claim 24, wherein the axial height of the interior space is at most equal to the axial height of the unit formed by the annular element, shaft element and washer when the internal and external screw thread are completely screwed into one another, preferably is less than or equal to 95% to 99% of said maximum height.

27. The adjustable foot according to claim 18, wherein the support part is at least partially, preferably completely, sunken in a zone of the shaft element that is surrounded by the external screw thread.

28. The adjustable foot according to claim 18, wherein, viewed in the axial direction, the height of the second adjustable part is less than or equal to the height of the first adjustable part and wherein, viewed in the radial direction, the dimensions of the second adjustable part are completely within the contour determined by the external screw thread.

29. The adjustable foot according to claim 18, wherein the support part has a concave surface and the washer a convex surface.

30. The adjustable foot according to claim 18, wherein the shaft element and the washer are provided with an axial opening for an anchor bolt.

31. The adjustable foot according to claim 18, wherein the axial opening through the washer has a diameter that is approximately 32 to 48% larger than the diameter of the axial opening through the shaft element.

32. The adjustable foot according to claim 18, wherein the axial length of the shaft element is equal to or less than the axial height of the annular element and wherein the shaft element is provided with external screw thread along its entire axial length and/or the internal screw thread of the axial bore extends over the entire axial height of the annular element.

33. Combination of an adjustable foot according to claim 18, a substructure, equipment set up in alignment on said substructure, and an anchor bolt, wherein the equipment is anchored to the substructure by means of the anchor bolt, with the adjustable foot between them.

34. The combination according to claim 33, wherein a bottom surface of the annular element rests on the substructure and wherein the equipment is in contact with the washer or with the cap which, in turn, is in contact with the washer.

35. Adjustable foot for setting up equipment in alignment, comprising: an annular element provided with an axial bore with internal screw thread; a shaft element provided with external screw thread matching the internal screw thread, which shaft element, when screwed into the bore, can be adjusted in the axial direction with respect to the annular element by turning with respect to the annular element; a support part, provided on the top of the shaft element, and a washer, wherein the washer and the support part are each provided with a convex respectively concave surface having essentially the same radius of curvature, such that an angle of the washer can be adjusted with respect to the support part about the radius of curvature; and a cap with a diameter greater than the diameter of the internal screw thread and/or greater than the diameter of the washer; wherein the support part is located completely within a contour determined by the diameter of the external screw thread, and in that an external diameter of the washer is at most equal to an external diameter of the second adjustable part.

36. The adjustable foot according claim 35, wherein the internal diameter of the cap is greater than the largest of the external diameters of the other parts of the adjustable foot, in particular is approximately 0.5 to 2% greater than said largest of the external diameters of the other parts.

37. The adjustable foot according to claim 36, wherein the cap contains a space, delimited by the cap, which has an axial height that is greater than or equal to the maximum axial length by which the shaft element can protrude from the annular element, or at least is intended to protrude at the maximum above the annular element.

38. The adjustable foot according to claim 37, wherein the cap extends downwards from the washer below the bottom outer peripheral edge of the washer, preferably extends at least approximately 5 to 10 mm below said bottom outer peripheral edge.

39. The adjustable foot according to claim 37, wherein the axial height of the interior space is at most equal to the axial height of the unit formed by the annular element, shaft element and washer when the internal and external screw thread are completely screwed into one another, preferably is less than or equal to 95% to 99% of said maximum height.

40. The adjustable foot according to claim 35, wherein the support part is at least partially, preferably completely, sunken in a zone of the shaft element that is surrounded by the external screw thread.

41. The adjustable foot according to claim 35, wherein, viewed in the axial direction, the height of the second adjustable part is less than or equal to the height of the first adjustable part and wherein, viewed in the radial direction, the dimensions of the second adjustable part are completely within the contour determined by the external screw thread.

42. The adjustable foot according to claim 35, wherein the support part has a concave surface and the washer a convex surface.

43. The adjustable foot according to claim 35, wherein the shaft element and the washer are provided with an axial opening for an anchor bolt.

44. The adjustable foot according to claim 35, wherein the axial opening through the washer has a diameter that is approximately 32 to 48% larger than the diameter of the axial opening through the shaft element.

45. The adjustable foot according to claim 35, wherein the axial length of the shaft element is equal to or less than the axial height of the annular element and wherein the shaft element is provided with external screw thread along its entire axial length and/or the internal screw thread of the axial bore extends over the entire axial height of the annular element.

46. Combination of an adjustable foot according to claim 35, a substructure, equipment set up in alignment on said substructure, and an anchor bolt, wherein the equipment is anchored to the substructure by means of the anchor bolt, with the adjustable foot between them.

47. The combination according to claim 46, wherein a bottom surface of the annular element rests on the substructure and wherein the equipment is in contact with the washer or with the cap which, in turn, is in contact with the washer.

48. The adjustable foot according to claim 18 or 35, wherein the diameter of the cap is at least 10%, in particular at least 25%, greater than the diameter of the internal screw thread and the diameter of the washer, respectively.

* * * * *